Nov. 21, 1950  C. J. HEIMARK  2,530,466
ENSILAGE CUTTER
Filed Feb. 26, 1948  3 Sheets-Sheet 1
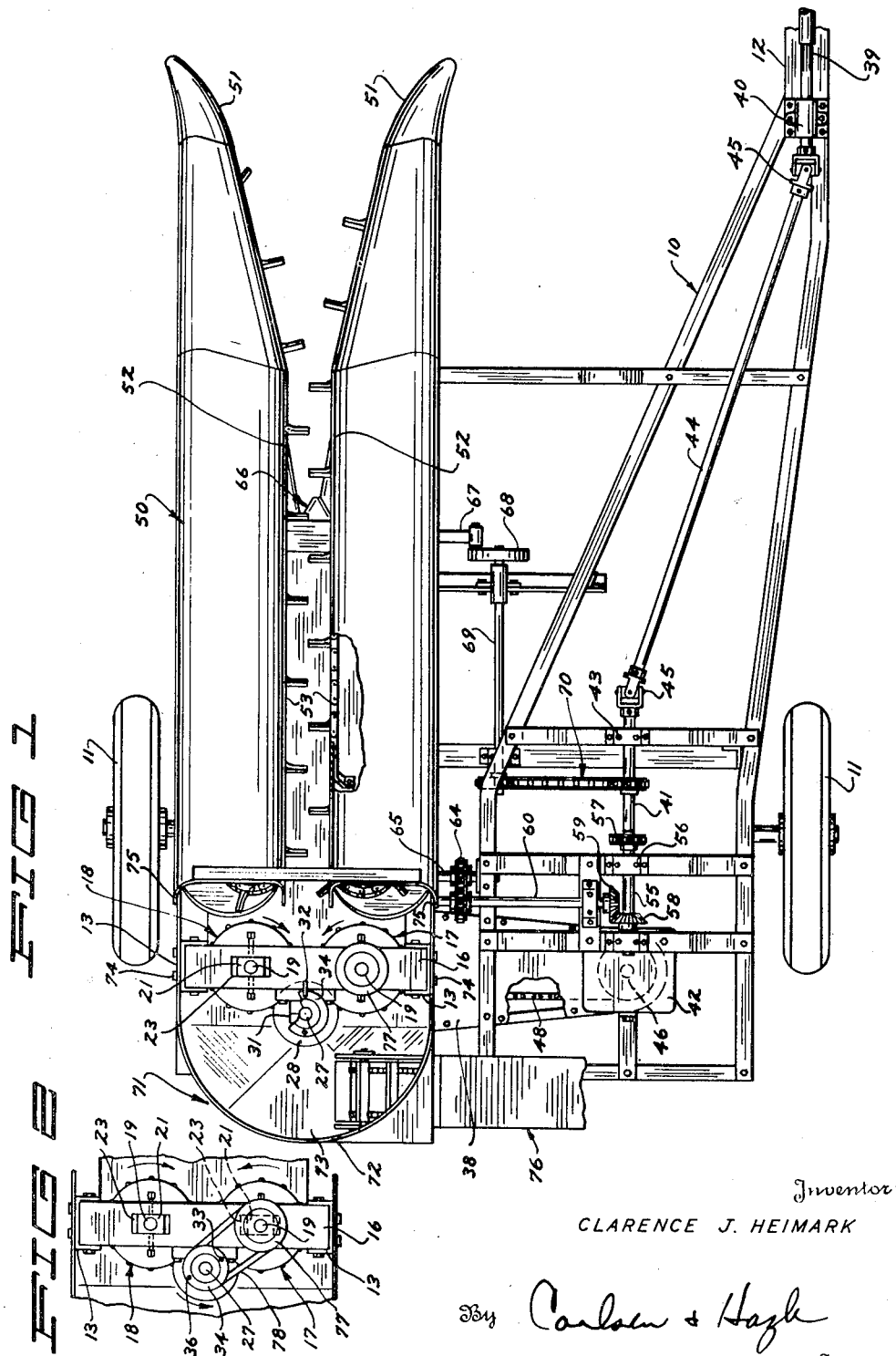
Inventor
CLARENCE J. HEIMARK
By Carlsen & Hazle
Attorney

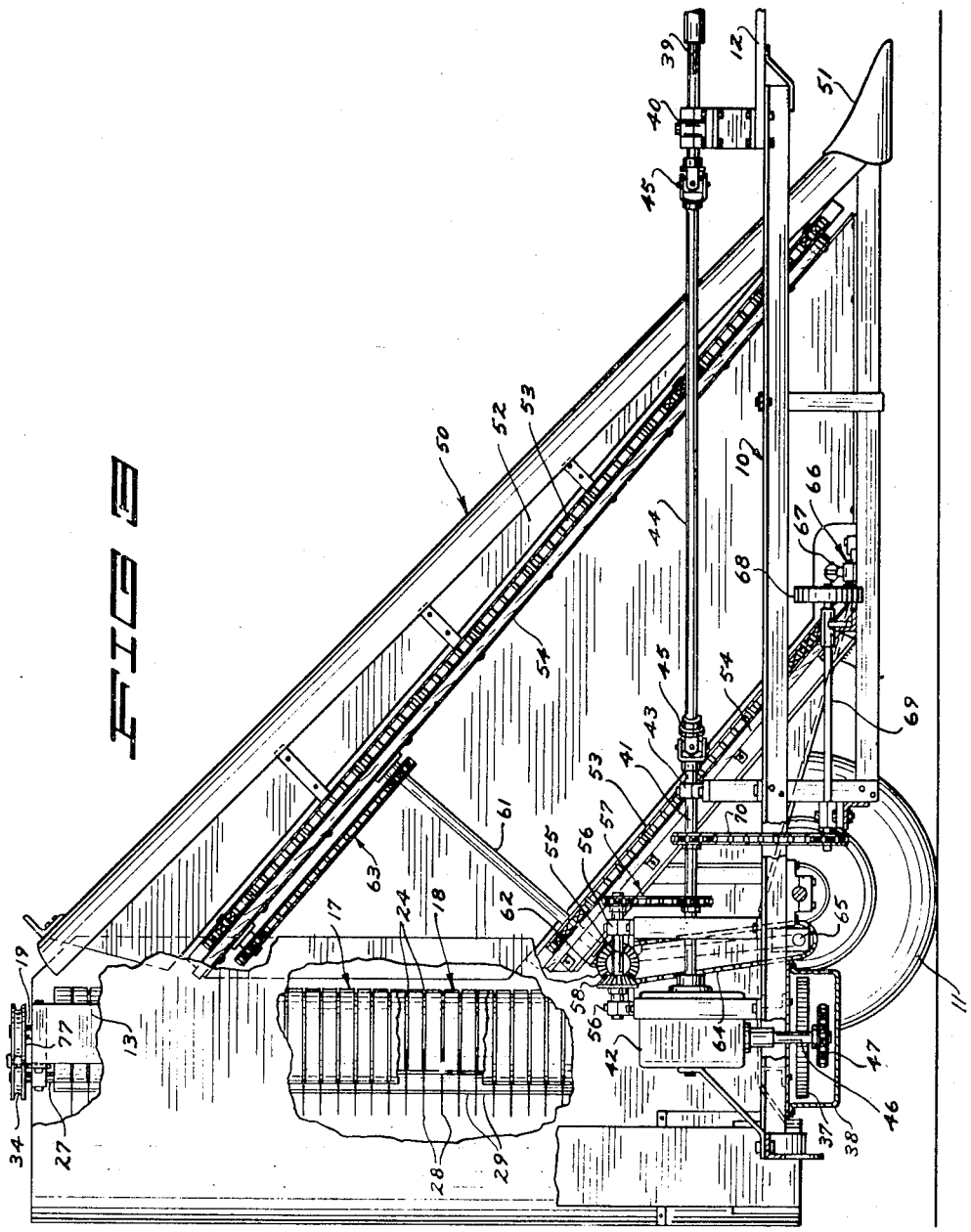

Nov. 21, 1950  C. J. HEIMARK  2,530,466
ENSILAGE CUTTER
Filed Feb. 26, 1948  3 Sheets-Sheet 3
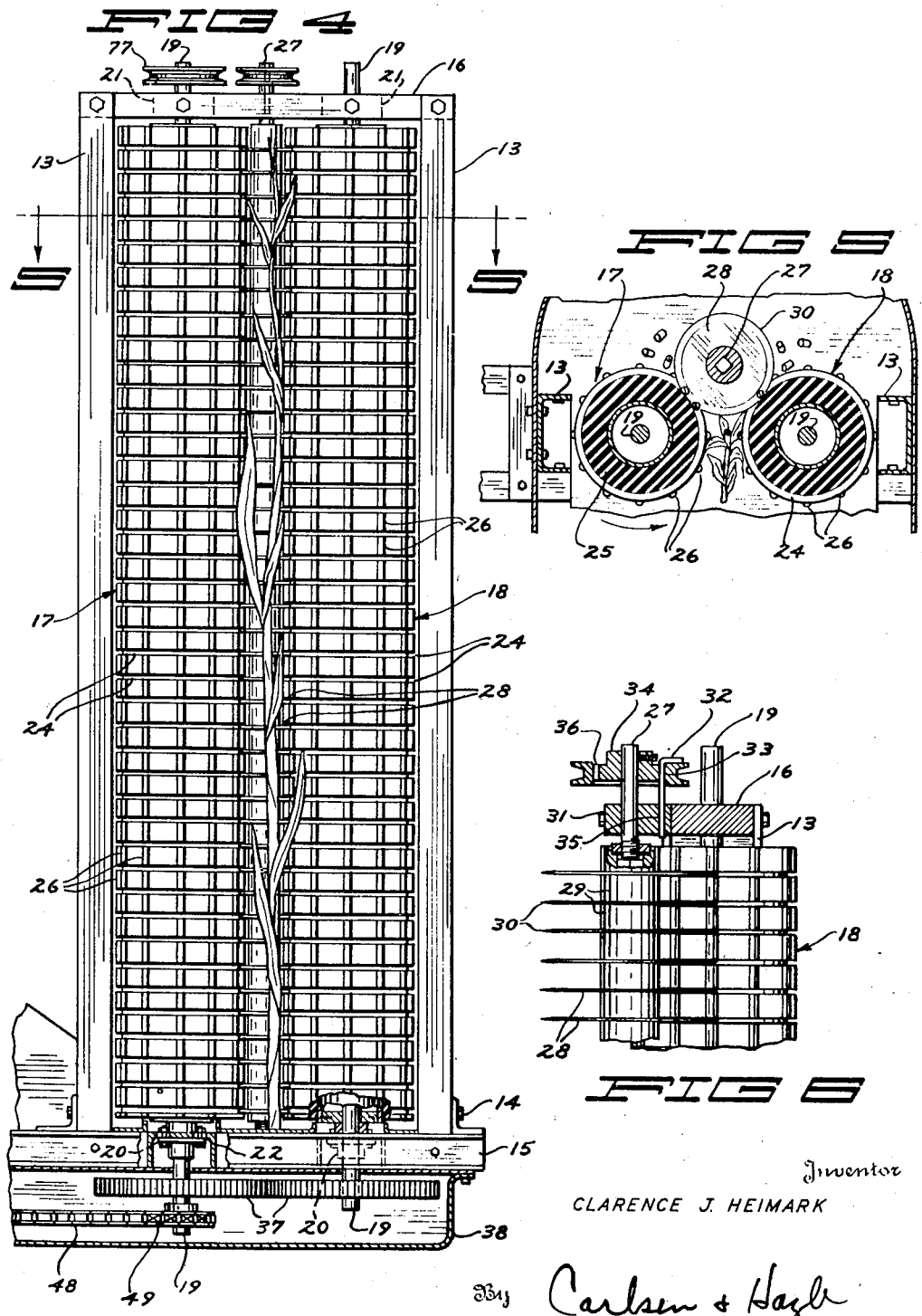
Inventor
CLARENCE J. HEIMARK
By Carlsen & Hagle
Attorney Patented Nov. 21, 1950

2,530,466

UNITED STATES PATENT OFFICE 2,530,466

ENSILAGE CUTTER

Clarence J. Heimark, Clarkfield, Minn.

Application February 26, 1948, Serial No. 11,189

2 Claims. (Cl. 146—98)

This invention relates to improvements in that type of farm machinery used for cutting or chopping corn and similar fodder crops for use as ensilage.

The primary object of the invention is to provide an improved machine for this purpose, operative to travel along the rows in the field and to gather and cut the standing crop and deliver it to a truck or wagon ready for the silo. Another object is to provide, for a machine of this character, an improved, simple and rapidly operating cutting mechanism which will be positive in its action, will cut the crop material into short lengths as rapidly as the machine advances over the field, and which will require very little attention on the part of the operator. Still another object is to provide a cutting mechanism which will wear but slowly and which may be conveniently sharpened and otherwise maintained in efficient operating condition.

These and other more detailed and specific objects will be disclosed in the course of the following specification, reference being had to the accompanying drawings, in which—

Fig. 1 is a plan view of a machine embodying my invention.

Fig. 2 is a fragmentary plan view, showing a selectively operative drive used in sharpening the cutters.

Fig. 3 is a side view of the machine with housing parts broken away to better show the cutting mechanism.

Fig. 4 is an enlarged fragmentary front elevational view showing the cutting mechanism.

Fig. 5 is a horizontal sectional view along the line 5—5 in Fig. 4.

Fig. 6 is an enlarged detail vertical sectional view showing the adjustable lock for the cutter.

The drawing illustrates one workable embodiment of my improved cutting mechanism in a machine adapted to be drawn by tractor over a field of fodder crop material such as corn and the machine comprises a main frame assembly, designated generally at 10, supported at its rear end by widespread ground wheels 11 and having a forwardly tapering portion terminating in a hitch bar 12 by which connection is made in usual fashion to the draw bar of the tractor. As is the custom in machines of this character, the hitch is so arranged with respect to the frame assembly that a lateral portion thereof will project outwardly from the path of the tractor and, as here shown, this is the left side of the frame as viewed from the rear thereof.

At the left rear corner of the frame 10 there is provided an inverted U-shaped frame structure comprising side bars 13 rigidly anchored at their lower ends at 14 to a transverse frame bar 15 and also rigidly connected at their upper ends by a cross bar 16. My improved cutting mechanism is arranged within this upright rectangular frame structure and comprises a pair of elongated feed rolls 17 and 18 having shaft extensions at their opposite ends, as designated at 19, which are journaled through bearings 20 and 21 in the bars 15 and 16, respectively. These feed rolls 17 and 18 are parallel and are spaced apart transversely with respect to the frame as a whole and it will be noted that provision for minor adjustment of this spacing is made by sliding the bearings 20 through openings 22 in the bar 15 and by mounting the upper bearings 21 in slots 23 and the bar 16. This being a well known expedient for this purpose, no further description is believed to be necessary herein. The feed rolls 17 and 18 have a profusion of peripheral grooves spaced along their length and also have their outer surfaces formed of rubber or some other resilient material as designated at 25 and provided with longitudinally extending gripping ribs or serrations 26.

Positioned between and behind the feed rolls 17 and 18 is an upright shaft 27 upon which are non-rotatably mounted a series of spaced cutting disks 28 held apart upon the shaft by collars 29 at the same spacing as that between the adjacent grooves 24. The disks 28 are circular in shape and the shaft 27 is so located that the edges of the disks will enter the grooves 24 in the feed rolls as best shown in Fig. 5. These edges of the disks 28 are beveled off and sharpened as indicated at 30, and it is to be noted that there is a running engagement between the sharpened edges and the grooved feed rolls for purpose later to appear. The upper and lower ends of the cutter disk shaft 27 are journaled in bearings 31 secured respectively to the upper cross bar 16 transverse frame bar 15 but the shaft is normally locked against rotation by means of a key 32, best shown in Fig. 6. This key 32 is removably positioned downwardly through an opening 33 in a pulley 34 secured to the upper end of the shaft 27 and drops also into an opening 35 in the upper bearing 31 to non-rotatably anchor the shaft. It will be noted that the pulley 34 also has another opening 36 diametrically opposed to the opening 33 so that the shaft and cutter assembly may be locked in either of two angular positions.

The feed rolls 17 and 18 are power rotated in opposite directions, so as to move rearwardly at their adjacent surfaces as indicated by the arrows in Fig. 1, and for this purpose the lower ends of the shafts 19 carry meshing gears 37 below the frame bar 15 and within a generally transversely extending housing 38. Power for this operation of the feed rolls is taken from the tractor power take-off shaft (not shown) by the usual front end connection 39 carried in a bearing 40 secured to the forward part of the frame 10. A countershaft 41 extends forwardly from a gear box 42 mounted upon the right rear corner of the frame assembly and the forward end of the countershaft is carried in a bearing 43 on the frame and is connected to the shaft 39 by power shaft 44 and the usual universal couplings 45. From the gear box 42 there depends a shaft 46 entering the housing 38 and a sprocket 47 on the lower end of this shaft is connected by sprocket chain 48 to a similar sprocket 49 secured to one of the shafts 19. This arrangement is obviously such that a power from the tractor power take-off will be transmitted to the feed rolls rotating them at a speed determined by the characteristics of the gear box 42.

Extending forwardly from the cutting mechanism and centered about a plane passing between the feed rolls 17 and 18 is a crop cutting and gathering mechanism, designated generally at 50, and this comprises the usual forwardly diverging gathering points 51 extending rearwardly into gathering sheets 52 which terminate in closely spaced parallel and upright portions ending just forward of the feed rolls. Conventional gathering chains 53 are arranged in the usual manner upon supporting boards 54 in the gathering sheets 52 and are power driven to run in rearward directions at their adjacent spans and this arrangement is obviously such that as the machine moves over the field, it will gather standing crop material and carry it toward the cutting mechanism. As shown in Fig. 3 upper and lower series of gathering chains are provided at each side and these chains are driven from the power take-off as will now be described. A short countershaft 55 is journaled in bearings 56 above the main countershaft 41 and is driven therefrom by a sprocket and chain connection, indicated generally at 57. A bevel gear 58 on the shaft 55 meshes with a similar gear 59 on a cross shaft 60 and this shaft 60 extends beneath the right-hand series of gathering chains and drives an upwardly, forwardly angling shaft 61 by means of bevel gears indicated at 62. The shaft 61 drives the rear sprocket for the lower righthand gathering chain directly and is connected by sprocket chain connection 63 to rear sprocket for the upper gathering chain as clearly shown in Fig. 3. For driving the lefthand gathering chains, a similar shaft and connection will obviously be used and power therefor is transmitted from the shaft 60 through a sprocket chain connection 64 to a shaft 65 extending across beneath the rear lower portion of the gathering mechanism. Since this connection in its precise details forms no part of my present invention, and is well known to those skilled in the art, it is not shown in detail herein.

As the crop material is gathered by the points 51 and started back by the gathering chains 53 it is severed close to the ground by a conventional sickle-type cutter, designated generally at 66, located below the gathering sheets 52 and operated by a pitman 67 from an eccentric 68. This mechanism is driven by shaft 69 having a sprocket and chain connection 70 to the countershaft 41 so that this cutter too, is operated from the tractor power take-off.

Positioned rearwardly of the cutting mechanism is a catch casing or receptacle, designated generally at 71, having a rounded rear wall 72 closed at its bottom 73 and extending forwardly and secured alongside the frame sides 13, as indicated at 74. These sides of the casing also extend forwardly a short distance and terminate inside the overhangs 75 of the gathering sheets 52 as shown in Fig. 1. A conventional elevator, designated generally at 76, enters the casing 71 at the bottom thereof, and this elevator angles upwardly and to the right so as to deliver crop materials to a wagon or truck running alongside the machine in the usual manner.

In operation, as the machine travels along a crop row, such as corn for instance, with the parts all in power operation from the tractor, it will be apparent that the gathering mechanism will move the corn rearwardly after it is cut off and deliver the stalks in an upright position into the throat of the cutting mechanism formed by the rearwardly moving surfaces of the feed rolls 17 and 18. These rolls, by the nature of their surfaces and the serrations thereon, as previously described, will engage the stalks with a positive motion and urge them rearwardly and force them through the cutting disks 28 and since these disks enter the grooves, their sharpened edges will slice the stalks into very short lengths as will be readily apparent. As the process continues, the cut material will be forced out behind the cutting mechanism from between the disks 28 and will drop into the casing 71 for delivery therefrom by the elevator 76. Since the stalks enter the cutting mechanism substantialy parallel with the axes of the feed rolls and the cutting disks, it will be apparent that each stalk will be chopped into segments throughout its entire length in one operation and thus it will readily be appreciated that the cutting mechanism will have a very high cutting capacity. Since the cutting disks 28 are stationary, they will cut with equal effectiveness at either side so that the feed rolls 17 and 18 will feed material through very rapidly, as will also be understood.

As an example of the operation of my machine, if the feed rolls be operated at a speed of approximately 400 R. P. M. and are eight inches (8") in diameter, while the travel movement of the machine is at a rate of three and one half (3½) miles per hour, then with the ordinary spacing of adjacent corn stalks along the row, the machine will be found to cut roughly 176 stalks per minute and each stalk will be forced through the cutter during approximately forty-five per cent (45%) of a complete revolution of either of the feed rolls. While these figures are only approximate, of course, they do indicate the high capacity of the machine.

The cutting disks 28 will, of course, be subject to some wear at the points where they enter the feed roll grooves and do the majority of the cutting and it is the purpose of the key 32 and the two openings 33 and 36 in the pulley 34 to enable the operator to turn the entire cutter disk assembly through a half turn to bring new edges into place when the ones previously used have become worn. Further, in accordance with my invention, the pulley 34 is matched by another pulley 77 upon one of the feed roll shafts 19, and as shown in Fig. 2, I may temporarily connect these pulleys by a belt 78 and then, by removing the key 32 and operating the machine, the cutting disk assembly will be rotated and the edges of the cutting disks may be readily resharpened, as will be understood. The aforesaid adjustments of the bearings for the feed rolls 17 and 18 allows minor spacing adjustments of the rolls to be made to compensate for the very slight wear which will result upon the rubber surfaces, but it will, of course, be understood that such adjustments will be within the range only of that permitted by the meshing teeth of the drive gears 37.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. Cutting mechanism of the character described, for cutting corn stalks and similar elongated crop materials, comprising a pair of elongated oppositely rotating feed rolls spaced apart to accommodate the corn stalks lengthwise, non-rotating cutting disks positioned in cooperating position between the rolls and spaced apart to slice the stalks into uniform lengths for use as ensilage, the said rolls both having peripheral grooves cooperating with a cutting action with opposite edge portions of the disks, and the rolls also having cushion-like surfaces with longitudinal serrations between the grooves to grip and feed the stalks.

2. Cutting mechanism of the character described, for cutting corn stalks and similar long crop materials, comprising a pair of elongated oppositely rotating feed rolls spaced apart to accommodate the corn stalks lengthwise, cutting disks arranged in cooperating position between the feed rolls and spaced apart to slice the corn stalks into uniform lengths for use as ensilage, the said rolls both having peripheral grooves cooperating with a cutting action with opposite edge portions of the disks, the said rolls also having cushion-like surfaces with longitudinal serrations between the grooves to grip and feed the stalks, and means locking the cutting disks against rotation while cutting, said locking means being adjustable to bring up new edge portions of the disks into cutting relation with the feed roll grooves as other edge portions become worn and being entirely disengageable for rotating the disks for sharpening them.

CLARENCE J. HEIMARK.

REFERENCES CITED

The following references are of record in the file of this patent:

UNITED STATES PATENTS

| Number | Name | Date |
|---|---|---|
| 414,766 | Fischer | Nov. 12, 1889 |
| 937,270 | Aikele | Oct. 19, 1909 |
| 1,410,320 | Kelly | Mar. 21, 1922 |
| 2,131,851 | Anstice | Oct. 4, 1938 |
| 2,188,522 | Alfs | Jan. 30, 1940 |
| 2,269,530 | Grant | Jan. 13, 1942 |

FOREIGN PATENTS

| Number | Country | Date |
|---|---|---|
| 455,290 | Germany | Oct. 31, 1925 |
| 641,775 | Germany | Feb. 12, 1937 |